United States Patent
Watts, Jr.

(10) Patent No.: US 7,519,439 B2
(45) Date of Patent: Apr. 14, 2009

(54) EFFICIENT DIGITAL PROCESSOR FOR FEEDBACK CONTROL APPLICATIONS

(75) Inventor: Charles Watts, Jr., Crowley, TX (US)

(73) Assignee: Texas Instruments Incorporated, Dallas, TX (US)

( * ) Notice: Subject to any disclaimer, the term of this patent is extended or adjusted under 35 U.S.C. 154(b) by 508 days.

(21) Appl. No.: 10/702,356

(22) Filed: Nov. 6, 2003

(65) Prior Publication Data

US 2004/0093530 A1   May 13, 2004

Related U.S. Application Data

(60) Provisional application No. 60/424,254, filed on Nov. 6, 2002, provisional application No. 60/439,318, filed on Jan. 10, 2003.

(51) Int. Cl.
| | |
|---|---|
| *G05B 13/02* | (2006.01) |
| *G06F 19/00* | (2006.01) |
| *G06F 15/00* | (2006.01) |
| *G05B 15/00* | (2006.01) |
| *G05D 9/00* | (2006.01) |
| *H04N 1/46* | (2006.01) |

(52) U.S. Cl. .......... 700/45; 700/279; 700/280; 700/286; 700/245; 358/1.9; 358/525

(58) Field of Classification Search .......... 700/45, 700/279, 280, 286, 245; 84/626; 382/300; 369/47.45; 345/89; 258/1.9, 525
See application file for complete search history.

(56) References Cited

U.S. PATENT DOCUMENTS

| | | | | |
|---|---|---|---|---|
| 4,465,966 | A * | 8/1984 | Long et al. ............ | 323/348 |
| 4,578,812 | A * | 3/1986 | Yui ...................... | 382/300 |
| 5,089,812 | A * | 2/1992 | Fuse et al. ............. | 345/89 |
| 5,202,824 | A * | 4/1993 | Chen .................... | 700/279 |
| 5,922,983 | A * | 7/1999 | Muramatsu ............ | 84/626 |
| 5,946,279 | A * | 8/1999 | Okada et al. .......... | 369/47.45 |
| 5,954,788 | A * | 9/1999 | Suh et al. ............. | 708/491 |
| 6,121,535 | A * | 9/2000 | Muramatsu ............ | 84/626 |
| 6,188,803 | B1 * | 2/2001 | Iwase et al. .......... | 382/300 |
| 6,477,203 | B1 * | 11/2002 | Poplin et al. ......... | 375/240.2 |
| 6,882,601 | B2 * | 4/2005 | Kadlec et al. ......... | 369/44.27 |
| 2002/0097643 | A1 * | 7/2002 | Kadlec et al. ......... | 369/44.13 |
| 2008/0170515 | A1 * | 7/2008 | Masuda et al. ........ | 370/286 |

\* cited by examiner

*Primary Examiner*—Albert DeCady
*Assistant Examiner*—Sunray R Chang
(74) *Attorney, Agent, or Firm*—Mirna Abyad; Wade J. Brady, III; Frederick J. Telecky, Jr.

(57) ABSTRACT

A digital processor (2, 102) for use in a digital controller (10) is disclosed. The digital processor (2, 102) includes a coefficient product memory (22) that stores previously calculated products of filter coefficients and each of a set of available input values. The memory (22) is addressed according to a received input value, and outputs a plurality of coefficient products associated with that input value. These coefficient products are combined across time samples (with one or more coefficient products delayed for use in later cycles), to produce an output value. The digital processor (2) can be used in combination with an analog-to-digital converter (4) and a pulse-width modulated circuit (6) to control a power supply. According to another embodiment of the invention, comparators (62H, 62L) and a counter (66) can be used instead of the analog-to-digital converter, for additional efficiency.

27 Claims, 4 Drawing Sheets

EFFICIENT DIGITAL PROCESSOR FOR FEEDBACK CONTROL APPLICATIONS

CROSS-REFERENCE TO RELATED APPLICATIONS

This application claims priority, under 35 U.S.C. §119(e), of Provisional Application No. 60/424,254, filed Nov. 6, 2002, and of Provisional Application No. 60/439,318, filed Jan. 10, 2003.

STATEMENT REGARDING FEDERALLY SPONSORED RESEARCH OR DEVELOPMENT

Not applicable.

BACKGROUND OF THE INVENTION

This invention is in the field of electronic circuits and systems, and is more specifically directed to feedback control in such circuits and systems.

Many modern electronic systems involve circuits that generate an output voltage or current, and feedback control of that output. A common example of such a circuit is a switching power supply, which generates a stable power supply voltage over varying loads, typically by controlling a push-pull output driver with a pulse-width modulated (PWM) control signal. Conventional switching power supply subsystems include a power supply controller, which receives a signal corresponding to the currently generated output voltage, and which adjusts the duty cycle of the PWM control signal in response to that output voltage. Other feedback-controlled electronic circuits and systems include motor controllers and other control systems.

In conventional switching power supplies, by way of example, power supply control circuits are typically implemented in the analog domain. The typical conventional analog controller involves an operational amplifier ("op amp") that generates an analog voltage in response to an analog comparison between a measure of the output signal and a reference voltage. The analog op amp output is applied to circuitry that generates PWM pulses at a duty cycle corresponding to the comparison; these pulses are applied to the gates of push-pull drive transistors. The duty cycle of the PWM pulses determines the drive applied by the push-pull drive transistors, with the duty cycle increased if the output voltage is too low and the duty cycle decreased if the output voltage is too high. In this conventional manner, the power supply output voltage is regulated to the desired voltage.

Analog power supply controllers have several drawbacks, however. As known in the art, analog control circuitry is generally quite vulnerable to noise. In addition, analog feedback controllers generally require discrete components, including passive components, which add to manufacturing cost and also occupy relatively large printed circuit board area. These discrete components are also often of such size and characteristics that integration into a single integrated circuit (or single "chip") is not possible for analog feedback controllers, particularly for high power output such as power supply control. And perhaps most importantly, analog power supply controllers are inflexible once implemented, typically requiring a complete redesign if the characteristics of the controller are to be modified.

It is therefore desirable to use digital circuitry for feedback controllers, such as switching power supply controllers. If digital control were available, modifications to software or firmware could effect modifications to the overall controller function, without requiring redesign of the controller and certainly without requiring replacement of components in the function. To the extent that this digital control is programmable, additional and different functions may be added to or otherwise implemented in the feedback controller, enabling added value to the overall system. In addition, proprietary feedback controller designs can be protected to a much higher degree in digital controllers, particularly those operating according to program code stored in hardware.

It has been observed, however, that conventional digital feedback controllers are prohibitively expensive for many applications. As known in the art, digital feedback control typically involves digital filter functions, of either or both of the infinite impulse response (IIR) or finite impulse response (FIR) type. These digital filters, as known in the art, typically involve multiply-and-accumulate operations. In order to perform these operations at the desired rate, conventional digital feedback controllers use a digital signal processors (DSPs). Examples of conventional DSPs are the TMS320c5X and TMS320c6X families of digital signal processors, available from Texas Instruments Incorporated. While these DSP devices have excellent performance and are well able to perform this control function, a DSP solution for this application is much more expensive than a corresponding analog controller. Less-expensive digital functions, such as microcontrollers, do not have the computational performance and capacity to perform real-time control.

BRIEF SUMMARY OF THE INVENTION

It is therefore an object of this invention to provide a low-cost digital controller that can control the generation of a stable output voltage or current.

It is a further object of this invention to provide such a controller that can be easily reprogrammed, for example to change its control characteristics.

It is a further object of this invention to provide such a controller that can be integrated into a single integrated circuit.

It is a further object of this invention to provide such a controller that does not require an analog-to-digital converter for receipt and measuring of the regulated output.

Other objects and advantages of this invention will be apparent to those of ordinary skill in the art having reference to the following specification together with its drawings.

The present invention may be implemented into a digital controller operating according to a digital filter function. The digital controller receives an input signal, for example corresponding to a voltage to be regulated, and includes a coefficient product memory that stores the product of potential input signal values with preselected coefficients, such as digital filter coefficients. An address signal is generated from the received input signal, and applied to the coefficient product memory to produce the corresponding product values, which are then combined according to the desired filter function to produce an output control signal.

According to another aspect of the invention, the digital controller is a reduced instruction set computer (RISC) including one or more instructions for summing the coefficient product output values in selected ways to execute the desired filter function.

According to another aspect of the invention, a pair of comparators are provided in connection with the digital controller, for comparing the received input signal with a plurality of threshold levels. The result of the comparison controls the direction in which a counter counts, with the output of the counter being used as (or to generate) the address of the coefficient product memory.

DETAILED DESCRIPTION OF THE INVENTION

The present invention will be described in connection with its preferred embodiments, namely as implemented as a digital power supply controller. It is contemplated that this invention is especially beneficial when utilized in such an application. However, it is also contemplated that other applications and uses will also benefit from this invention, examples of which include motor controllers, control functions conventionally implemented by microcontrollers, and digital filter circuits. Accordingly, it is to be understood that the following description is provided by way of example only, and is not intended to limit the true scope of this invention as claimed.

Figure 1:
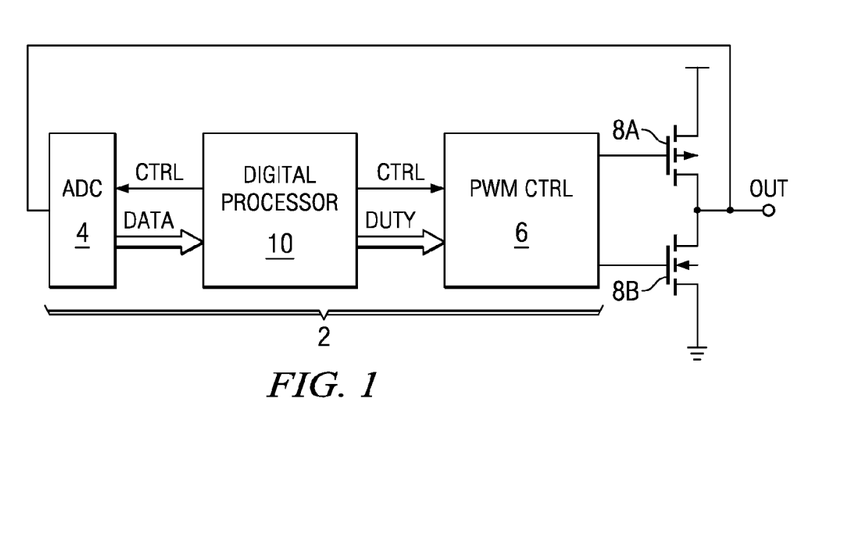
FIG. 1 is an electrical diagram, in block form, of a power supply including a digital controller according to a first preferred embodiment of the invention.

FIG. 1 schematically illustrates a digitally controlled power supply including digital controller 2 constructed according to a first preferred embodiment of the invention. In this embodiment of the invention, output voltage OUT is driven by a complementary metal-oxide-semiconductor (CMOS) push-pull arrangement of p-channel MOS transistor 8A and n-channel MOS transistor 8B. Of course, transistors 8A, 8B may be bipolar transistors, and need not be complementary (i.e., may be of the same conductivity type) according to either MOS or bipolar technology; further in the alternative, output voltage OUT may be driven by an single device, for example in an open-drain or open-collector arrangement. Transistor 8A has its source biased to a power supply voltage (at least as high as the desired highest voltage to appear as output voltage OUT) and its drain connected to the drain of transistor 8B at the node driving power supply voltage OUT, while the source of transistor 8B is at ground. The gates of transistors 8A, 8B are driven with complementary (in this example) pulse-width modulated (PWM) signals driven by PWM control circuit 6. The duty cycle of the PWM signals applied to the gates of transistors 8A, 8B thus determines the level of output voltage OUT.

This duty cycle of the output signals from PWM control circuit 6 is determined by digital processor 10, in response to the level of output voltage OUT. In this first embodiment of the invention, analog-to-digital converter (ADC) 4 receives an input signal corresponding to output voltage OUT. This input signal may be a direct measure of output voltage OUT itself, or may be a current mode measurement or other indirect measurement of the drive of transistors 8A, 8B. Digital processor 10 also may issue control signals to ADC 4 and PWM control circuit 6, as shown in FIG. 1, for example for setting certain operational parameters of these functions.

In operation, ADC 4 applies a digital signal DATA, corresponding to the measure of output voltage OUT received at its input, to digital processor 10. According to this embodiment of the invention, digital processor 10 processes the digital signal DATA according to a digital filter function, and generates an output signal DUTY that is applied to PWM control circuit 6. According to this embodiment of the invention, output signal DUTY is a digital signal representative of the duty cycle with which PWM control circuit 6 is to drive transistors 8A, 8B. Output signal DUTY may be directly applied, in digital form, to PWM control circuit 6, or alternatively may be converted into an analog signal by a conventional digital-to-analog converter (not shown). Typically, the feedback control effected by ADC 4, digital processor 10, and PWM control circuit 6 is negative feedback, so that the duty cycle indicated by output signal DUTY varies inversely with output voltage OUT. For example, if the load driven by output voltage OUT increases, pulling down output voltage OUT, digital processor 10 will increase the duty cycle indicated by output signal DUTY, increasing the drive applied by transistors 8A, 8B. Conversely, if the load driven by output voltage OUT decreases, the rise of output voltage OUT will be sensed by ADC 4, and digital processor 10 will decrease the duty cycle indicated by output signal DUTY, in turn decreasing the drive applied by transistors 8A, 8B.

Figure 2:
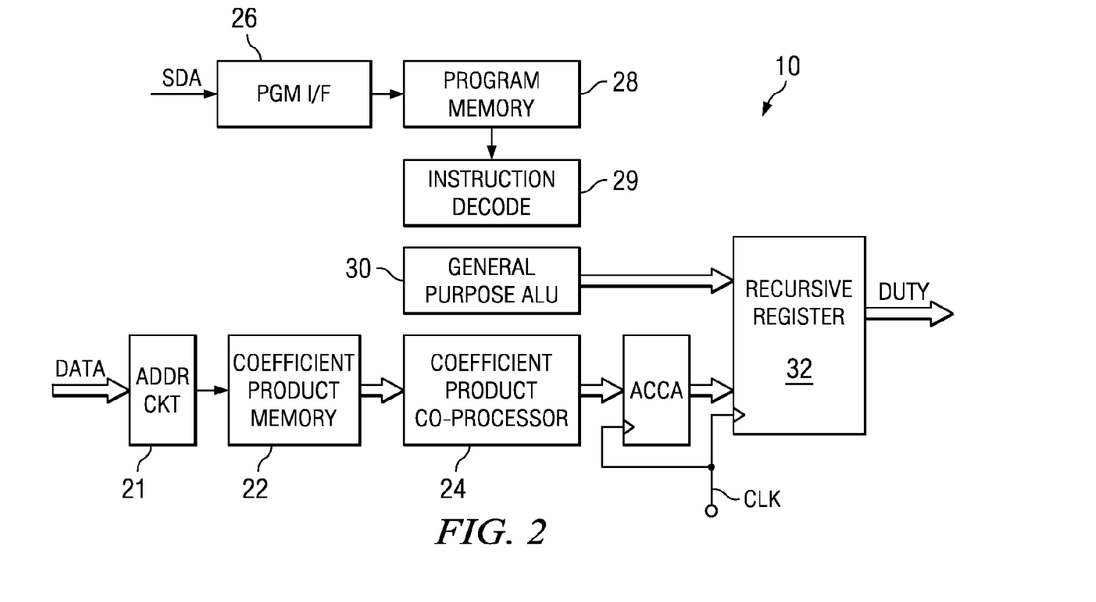
FIG. 2 is an electrical diagram, in block form, of the digital controller of FIG. 1, according to the first preferred embodiment of the invention.

FIG. 2 illustrates the overall construction of digital processor 10 according to this first preferred embodiment of the invention. Digital processor 10 is preferably a programmable processor of the reduced instruction set computer (RISC) type. In this example, digital processor 10 is a Harvard architecture processor, and as such includes program memory 28. Program memory 28 may be a read-only memory (ROM) storing pre-programmed instructions; to provide flexibility of operation, program memory 28 preferably includes programmable locations for storing program instructions received on input lines SDA via program interface 26. In either case, program memory 28 forwards instruction opcodes indicated by a program counter or other control functionality (not shown) to instruction decode 29. Instruction decode 29 generates control signals (not shown) that control the remainder of the circuitry of digital processor 10 according to the operative program instructions, as conventional in modern processors.

Of course, the particular architecture of digital processor 10 may vary from that shown in FIG. 2. In addition, considering that an important benefit of this invention is the low cost implementation of digital control, digital processor 10 may be a relatively small scale processor, for example having 8-bit data paths. It is contemplated that those skilled in the art having reference to this specification will be able to readily adapt the implementation of digital processor, for example in regard to architecture and data path width, to each particular implementation and cost requirements.

Digital processor 10 according to this preferred embodiment of the invention includes address circuitry 21, which receives digital value DATA from ADC 4 (FIG. 1) corresponding to the measurement of output voltage OUT as described above. Address circuitry 21 generates an address corresponding to this digital value DATA to coefficient product memory 22.

Coefficient product memory 22 may be constructed as random access memory (RAM), or as a non-volatile memory if desired, for storing pre-calculated products of digital values with digital filter coefficients. As known in the art, digital filter functions are implemented as the sum of the products of current and previous sample values with filter coefficients. For example, a finite impulse response (FIR) filter is of the form:

$$y_n = \sum_{i=0}^{k} g_i x_{n-i}$$

where $y_n$ is the current output value, $x_{n-i}$ is the $i^{th}$ previous input value (with i=0 corresponding to the current input value), and the set of $g_i$ values are the corresponding filter coefficients. Infinite impulse response (IIR) filters use previous output values $y_{n-k}$ to generate the current output value $y_n$, and are thus of the form:

$$y_n = \sum_{i=0}^{k} g_i x_{n-i} - \sum_{i=1}^{k} h_i y_{n-i}$$

where $h_i$ is the filter coefficient applied to the corresponding previous output value $y_{n-i}$. As known in the art, digital signal processors (DSPs) are high-performance programmable processors that include multiply-and-add units for quickly and efficiently performing sum-of-product operations such as those used in digital filters, discrete Fourier transforms (DFTs), and other similar operations that are useful in digital signal processing. Accordingly, as mentioned above, a DSP would be capable of executing the digital filter function desired for digital control of output voltage OUT, but such a DSP solution would be prohibitively expensive. It has been discovered, in connection with this invention, that the multiplier function can be eliminated to provide a low-cost solution. In digital processor 10 according to this invention, this elimination of the multiplier function is accomplished by coefficient product memory 22, which stores all possible products of the desired filter coefficients with the input digital values DATA.

In this embodiment of the invention, it is contemplated that a second order digital filter (i.e., i=2) is suitable for control of output voltage OUT, and that the necessary precision of the measurement of output voltage OUT may be on the order of six bits, such that digital value DATA from ADC 4 is a six-bit value. Considering the three product terms applied to input digital values DATA, coefficient product memory 22, in this example, must therefore store at least sixty-four possible product values for each of three coefficients. As will be described in further detail below, coefficient product memory 22 may store three products for each of the sixty-four possible values of digital value DATA, with these three products addressable in response to the current digital value DATA.

In any event, the output of coefficient product memory 22 is applied to coefficient product co-processor 24, which performs an additive combination (including either or both sums and differences) on the coefficient products according to the particular instruction being executed. The result of this operation is output by coefficient product co-processor 24 to register ACCA, synchronously with a clock signal CLK, which is preferably generated by clock circuitry (not shown) within digital processor 10 in the conventional manner.

In this embodiment of the invention, digital processor 10 also includes recursive register 32, which receives the contents of register ACCA. The construction and operation of recursive register 32 will be described in detail below. For purposes of this general description of the overall architecture of digital processor 10 relative to FIG. 2, recursive register 32 is capable of applying a previous output value (i.e., based on a previous output of coefficient product co-processor) to the current output value in register ACCA to generate an output value to be presented on output lines DUTY to PWM control circuitry 6, in response to the execution of a particular program instruction to do so, under the control of instruction decode 29. Alternatively, again depending upon the instruction being executed, recursive register 32 may simply forward the output of coefficient product co-processor 24 in register ACCA to output lines DUTY. Digital processor 10 also preferably includes a general purpose arithmetic logic unit 30, for executing conventional arithmetic and logical instructions; recursive register 32 is capable of completing the execution of these operation and forwarding the results accordingly, under the control of instruction decode 29.

Figure 3:
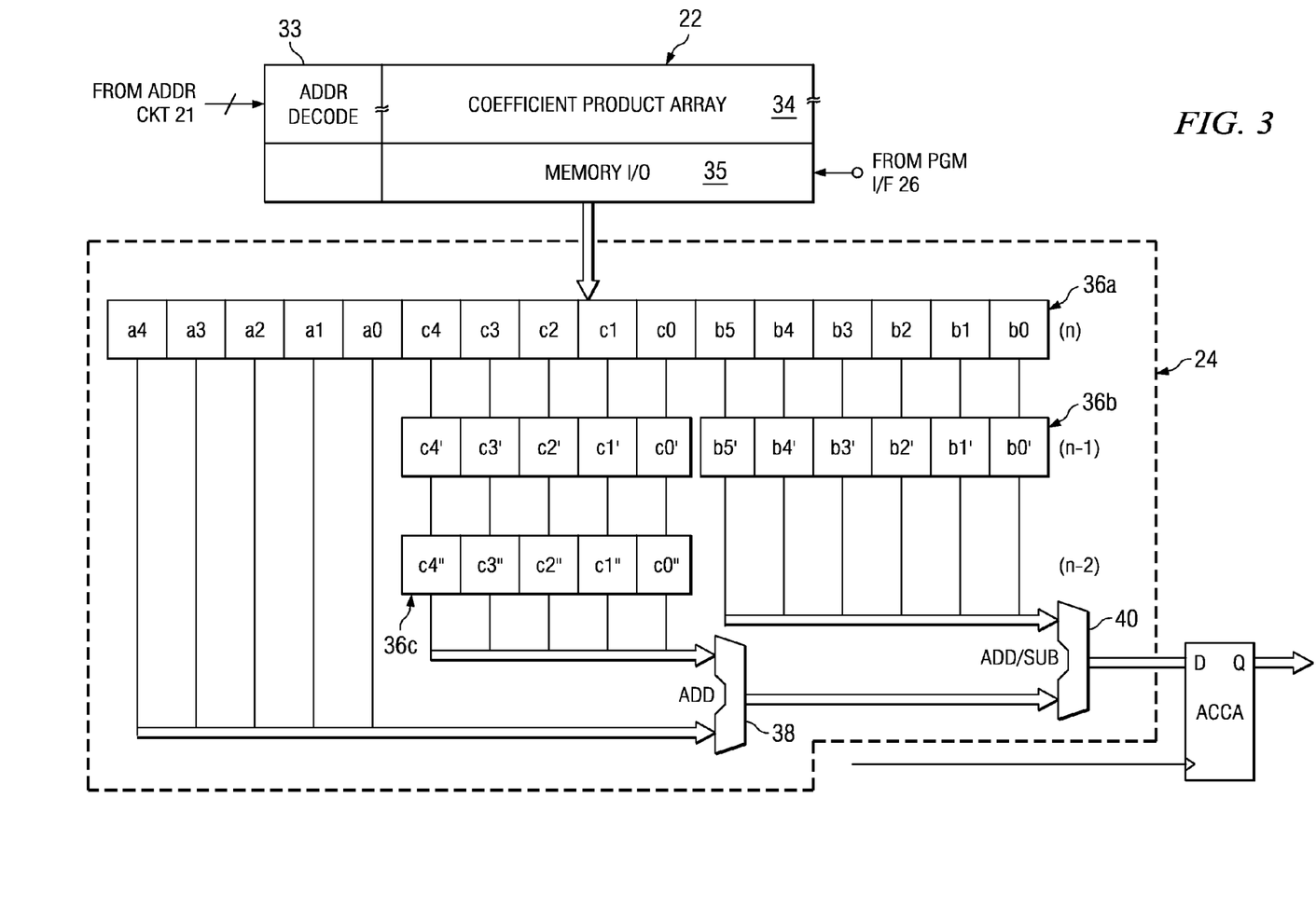
FIG. 3 is an electrical diagram, in block form, of a coefficient product coprocessor in the digital controller of FIG. 2, constructed according to the preferred embodiments of the invention.

Referring now to FIG. 3, the construction and operation of coefficient product memory 22 and coefficient product co-processor 24 will now be described in detail. Coefficient product memory 22, as mentioned above, is preferably a randomly-accessible memory, such that it presents (or receives, as the case may be) a data word associated with an address value. In this example, coefficient product array 34 is arranged as sixty-four rows (one for each possible value of six-bit digital value DATA) of sixteen memory cells. Coefficient product memory 22 also includes address decoder 33, for selecting a row of coefficient product array 34 according to a received address, and memory input/output circuitry 35 for reading the selected row and presenting the sixteen output data bits to coefficient product co-processor 24, in this example. Coefficient product memory 22 is preferably also writable with pre-calculated coefficient product values, for example by from general purpose ALU 30, or alternatively from program interface 26, under the execution of program instructions associated with such writing.

The contents of each row of coefficient product array 34 are best described, in this example, relative to the arrangement of register 36a in coefficient product co-processor 24, which receives the output data from coefficient product memory 22. For the second-order digital filter that is applied in this embodiment of the invention, as noted above, three coefficient products are associated with each input value. As such, each row of coefficient product array 34 contains three coefficient products a, b, and c of a corresponding input data value x: referring to the general digital filter form discussed above, these three products are:

$a = g_0 x$ $b = g_1 x$ $c = g_2 x$

As shown in FIG. 3, with reference to register 36a, these three products are arranged with product b occupying bits 0 through 5 (the six LSBs) of its row, product c occupying bits 6 through 10 of the row, and product a occupying bits 11 through 15 of the row.

Figure 4:
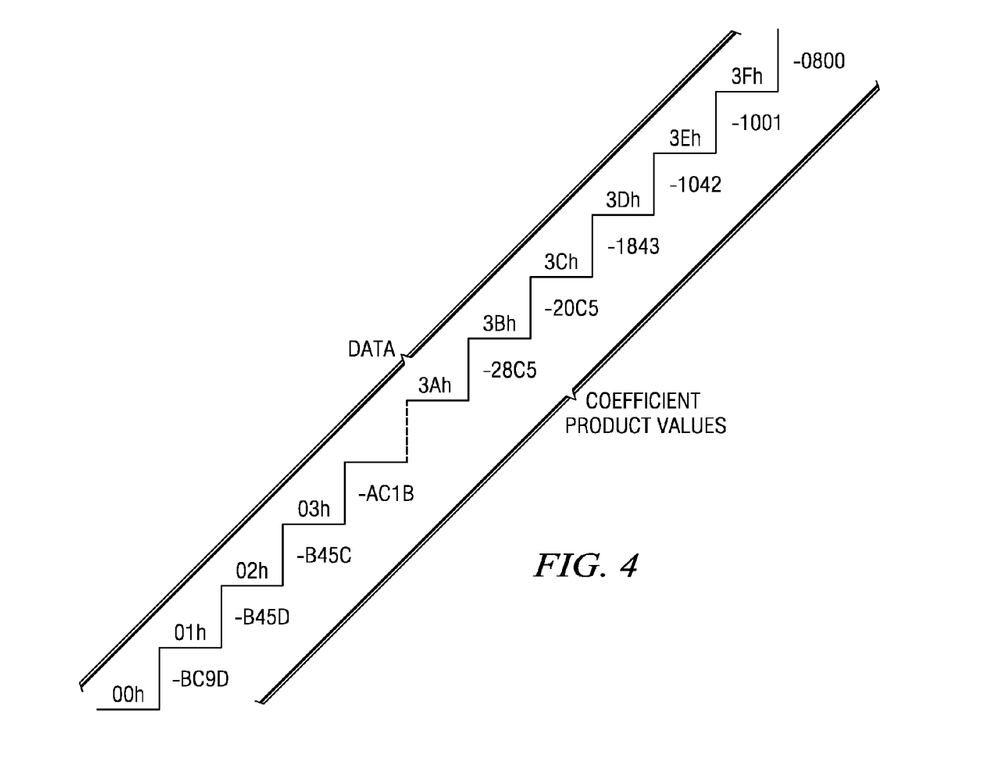
FIG. 4 is a plot of an example of input signal values and corresponding coefficient product values, as stored in a coefficient product memory according to the preferred embodiments of the invention.

FIG. 4 illustrates an exemplary correspondence of input data values DATA versus the corresponding contents of coefficient product memory 22, for the example of a digital filter applying negative feedback, such as for a power supply controller as shown in FIG. 1. Because of the negative feedback control, the coefficient product values will tend to inversely vary with the digital value DATA corresponding to measured output voltage OUT, as shown in FIG. 4. Of course, the specific coefficient product values depend not only on the corresponding digital value DATA, but also on the digital filter coefficients.

In operation, address decoder 33 receives an address value from address circuitry 21, the address value corresponding to the received digital value DATA received from ADC 4 in this example, and selects the corresponding row of coefficient product array 34. The bits stored in that selected row are read by memory input/output circuitry 35, and presented to register 36a in coefficient product co-processor 24.

As mentioned above, coefficient product co-processor 24 includes various registers 36 for storing the coefficient products from coefficient product memory 22, and in this example, for effecting the appropriate delays of these products specified by the digital filter function. Coefficient product co-processor 24 also includes adder 38, for performing a binary addition of two digital values applied to its inputs, and which has its output coupled to an input of adder/subtractor 40. Adder/subtractor 40 selectably (under the control of instruction decode 29) receives a digital value from registers 36, as will be described below, and adds or subtracts this value to or from the output of adder 38. The output of adder/subtractor 40 is forwarded to the input of register ACCA.

Register 36a receives the coefficient product values from coefficient product memory 22. The bits of register 36a corresponding to coefficient product a are coupled to one input of adder 38. The bits of register 36a corresponding to coefficient products c and b are coupled to register 36b; accordingly, register 36b stores the coefficient product values c' and b', which are from the previous access of coefficient product memory 22 (i.e., delayed one sample period from the current coefficient products a, b, and c in register 36a). The bits of register 36b corresponding to previous coefficient product b' are coupled to one input of adder/subtractor 40 in coefficient product co-processor 24, while the bits of register 36b corresponding to previous coefficient product c' are coupled to register 36c. Register 36c thus stores coefficient product value c", which is from the second previous access of coefficient product memory 22 (i.e., delayed two sample periods from the current coefficient products a, b, and c in register 36a). Register 36c is coupled to a second input of adder 38, and the output of adder 38 is coupled to a second input of adder/subtractor 40.

Figure 5:
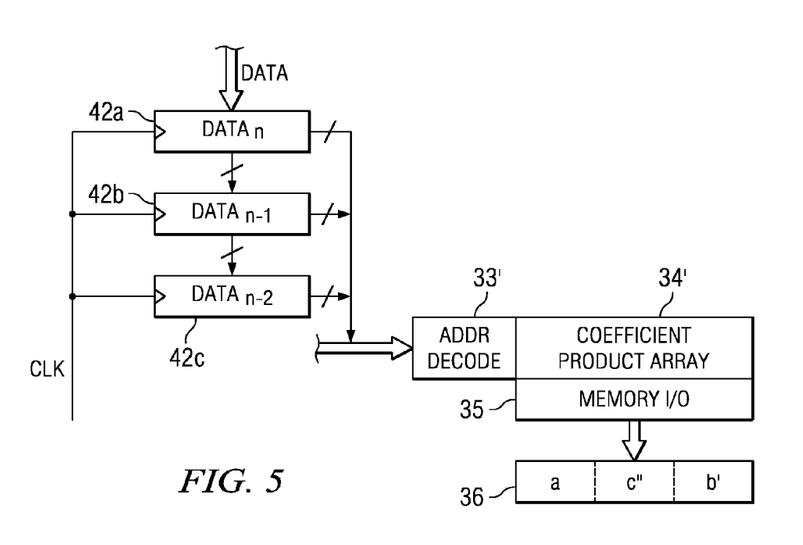
FIG. 5 is an electrical diagram, in block form, of an alternative implementation of the coefficient product memory according to the preferred embodiments of the invention.

It is contemplated that other techniques may be used to generate coefficient products a, b', and c" from coefficient product memory 22. FIG. 5 illustrates one such alternative approach, by way of further example. In this example, the address applied to coefficient product array 34 is generated to include not only the most current value $DATA_n$, but also the two previous values $DATA_{n-1}$ and $DATA_{n-2}$. This is effected by a series of clocked registers 42a, 42b, 42c, as shown in FIG. 5. Register 42a receives the most recent data value $DATA_n$; as register 42a stores this value, its previous contents are stored in register 42b as previous data value $DATA_{n-1}$, and the previous contents of register 42b are stored in register 42c as second previous data value $DATA_{n-2}$. The contents of registers 42a, 42b, 42c are combined to form a wider address value, which is applied to address decode 33', and which selects the corresponding contents of coefficient product array 34'. According to this alternative implementation, coefficient product array 34' may be a significantly larger memory array, having a row for each of the possible combinations of the three data values DATA; further in the alternative, coefficient product array 34' may be arranged to have three separately addressable portions (one for each of the coefficient products a, b', and c"), each addressable by the contents of an associated one of registers 42a, 42b, 42c. In any event, the data word read from coefficient product array 34' via memory input/output circuit 35 includes the three coefficient products a, c", and b' (in that order), which may be loaded into register 36 of coefficient product co-processor 24. In this alternative approach, only a single register 36 is required in coefficient product co-processor 24, as the contents of this register 36 already include the once-delayed and twice-delayed coefficient products b' and c", respectively.

The circuitry required for coefficient product memory 22 can be further reduced if one is willing to approximate the filter equations. For example, if one approximates the filter equation by assuming that the previous coefficient products b' and c" are based on the product of the corresponding coefficients $g_1$ and $g_2$ multiplied by the current data value $DATA_n$ minus one (i.e., $DATA_n-1$) and the current data value $DATA_n$ minus two (i.e., $DATA_n-2$), respectively, only a single register 42a is then necessary. Each access of coefficient product memory 22 will then return the current actual coefficient product a, and approximations of the coefficient products c" and b', based on the coefficients multiplied by once-decremented and twice-decremented values of the current data value $DATA_n$, rather than multiplied by the actual once-delayed and twice-delayed data values $DATA_{n-1}$, $DATA_{n-2}$. Of course, other similar approximations (e.g., using once-incremented and twice-incremented data values) may alternatively be used in this arrangement.

In any case, according to this embodiment of the invention, coefficient product co-processor can execute two special instructions useful in the processing of a digital filter function. One of the instructions, DI-ADD, executes the following calculation:

$$a+c''+b'$$

which corresponds to this digital filter sum of products:

$$g_0 x_n + g_2 x_{n-2} + g_1 x_{n-1}$$

using the general form of the digital filter equations discussed above. Coefficient product co-processor 24 executes this operation by summing the a coefficient product from register 36a and the c" coefficient product from register 36c at adder 38, and adding the b' coefficient product from register 36b to this sum at adder/subtractor 40. The other one of these instructions, DI-SUB, executes the calculation:

$$a+c''-b'$$

which corresponds to this digital filter sum of products:

$$g_0 x_n + g_2 x_{n-2} - g_1 x_{n-1}$$

This operation is performed by the summing of the a coefficient product from register 36a and the c" coefficient product from register 36c at adder 38, as before; in this subtraction operation, however, adder/subtractor 40 subtracts the b' coefficient product from register 36b from the sum generated by adder 38. In each case, the result from adder/subtractor 40 is stored in register ACCA.

According to the preferred embodiment of the invention, this result may be forwarded through recursive register 32 (FIG. 2) to PWM control circuit 6, as output signal DUTY, if the digital filter applied by digital processor 10 is to be of the FIR type (i.e., the output does not depend on prior values of the output). These digital filters can be performed by a relatively short program sequence, as will now be described.

For the case where the digital filter equation is:

$$y_n = g_0 x_n + g_2 x_{n-2} + g_1 x_{n-1}$$

an example of a four-statement program sequence can be executed by digital processor 10 as follows:

```
START:      SAMPLE
            DI-ADD
            ST     ACCA, outport
            JMP    START
```

In this routine, START is simply an instruction label, indicating the destination of the subsequent jump instruction JMP. Instruction SAMPLE is an executable instruction by way of which address circuit 22 is clocked to receive the input signal DATA and apply its value to coefficient product memory 22, which in turn reads the row corresponding to that value of input signal DATA. These contents are stored in register 36a, the previous contents of register 36a for the b and c coefficient products are stored in register 36b as coefficient products b' and c', and the previous contents of register 36b for the c' coefficient product is stored in register 36c as coefficient product c". Instruction DI-ADD is then executed, as described above, to add the three coefficient products a+c"+b'. The result of this operation, at the output of adder/subtractor 40, is stored at register ACCA. The next instruction, ST, forwards the contents of register ACCA to the output port of digital processor 10, as output signal DUTY. The JMP instruction then returns control to label START, and the process is then repeated for the next sample.

Similarly, digital processor 10 can also easily process a digital filter according to the digital filter equation:

$$y_n = g_0 x_n + g_2 x_{n-2} - g_1 x_{n-1}$$

by the four-statement program sequence:

```
START:      SAMPLE
            DI-SUB
            ST     ACCA, outport
            JMP    START
``` which is identical to the sequence described above, except that the DI-ADD instruction is replaced by the DI-SUB instruction. In this case, the execution of the DI-SUB instruction adds the coefficient products a+c" at adder 38, and then controls adder/subtractor 40 to subtract the b' coefficient product from the output of adder 38. This result is then forwarded as output signal DUTY by the ST instruction, and the process repeats.

Digital processor 10 is also capable of implementing a recursive sum operation, for example in which newly calculated values constitute an "error" value which is applied to previous output results, in determining the current output result. These operations are implemented by way of recursive register 32, which will now be described relative to FIG. 6.

Figure 6:
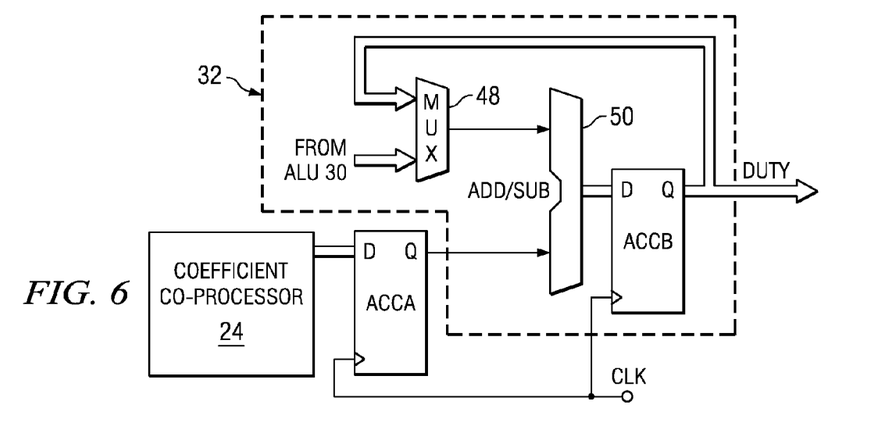
FIG. 6 is an electrical diagram, in block form, of a recursive register in the digital controller of FIG. 2 according to the preferred embodiments of the invention.

Recursive register 32 includes adder/subtractor 50, which receives the contents of register ACCA at one input, and receives the output of multiplexer 48 at another input. The output of adder/subtractor 50 is applied to the input of register ACCB, which presents the output signal DUTY at its output. Multiplexer 48 receives the output of general purpose ALU 30 at one input, and the output signal DUTY at another input. Registers ACCA, ACCB are preferably clocked by clock signal CLK. Each of multiplexer 48 and adder/subtractor 50 are controlled by instruction decode 29 (FIG. 2), to effect the desired instruction execution.

Recursive register 32 is capable of forwarding the contents of register ACCA directly through to register ACCB, for example in the execution of the ST instruction described above, with register ACCB corresponding to the output port "outport" of that instruction. This is executed by adder/subtractor 50 being controlled to not modify the contents of register ACCA (e.g., by adding "0" to those contents), and register ACCB then storing the output of adder/subtractor 50. Similarly, recursive register 32 can forward the output of general purpose ALU 30 to register ACCB, for example in executing a general purpose arithmetic or logical instruction, by controlling multiplexer 48 to select the output of general purpose ALU 30 and then controlling adder/subtractor 50 to not modify that output, so that register ACCB then stores the output from general purpose ALU 30 for presentation as output signal DUTY.

According to this embodiment of the invention, therefore, a new instruction RECUR_SUM can be executed by digital processor 10. This execution is performed by instruction decode 29 controlling multiplexer 48 to select the current contents of register ACCB for application to adder/subtractor 50, and controlling adder/subtractor 50 to add these current contents of register ACCB to the contents of register ACCA. As described above, register ACCA contains the result from coefficient product co-processor 24, in which the coefficient product b' is either added to or subtracted from the other coefficient products depending upon whether a DI-ADD or DI-SUB instruction is executed. Adder/subtractor 50 then adds these current contents of register ACCB to the contents of register ACCA. The output of adder/subtractor 50 as a result of this instruction, in terms of the product coefficients, is:

$$y_n = y_{n-1} + a \pm b' + c''$$

These results are then stored in register ACCB, and are applied as output signal DUTY.

By providing the ability to include the previous result into the current output value, it is contemplated that recursive register 32 can be used to complete the calculation of an IIR digital filter equation:

$$y_n = (g_0 x_n + g_2 x_{n-2} \pm g_1 x_{n-1}) - h_1 y_{n-1}$$

The filter coefficient $h_1$ that is to be applied to the previous output value $y_{n-1}$ is preferably normalized out in the determination of the coefficient products stored in coefficient product memory 22, to avoid the necessity of a multiplication in the feedback loop in recursive register 32. The output signal DUTY may be scaled to remove this normalization, for example at PWM control circuit 6 or elsewhere. Alternatively, a shifter may be included in the feedback loop of recursive register 32 (i.e., prior to multiplexer 48) to incorporate the filter coefficient $h_1$.

It is contemplated that digital controller 2, constructed according to this first preferred embodiment of the invention, can be readily implemented into a single integrated circuit.

Figure 7:
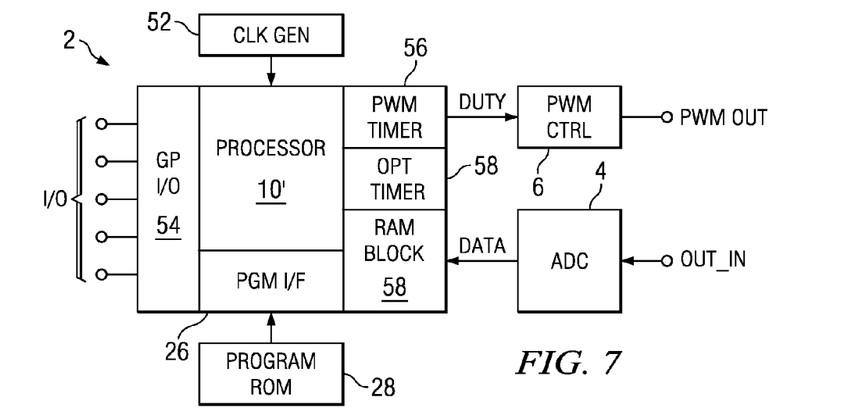
FIG. 7 is a layout of a single-chip integrated circuit embodying the digital controller constructed according to the first preferred embodiment of the invention.

FIG. 7 illustrates an exemplary layout of such a single-chip realization of digital controller 2, with like reference numerals in FIG. 7 referring to corresponding functions in the other Figures. As shown in FIG. 7, several general purpose input/output terminals may be connected to general purpose I/O block 54, for example by way of which program ROM 28 can be programmed, or by way of which coefficient product values can be stored in coefficient product memory 22 within RAM block 58. Processor 10' in FIG. 7 corresponds to the circuitry of FIG. 2, except that program memory 28, program interface 26, and RAM block 22 are illustrated as outside of processor 10' in the layout of FIG. 7. Clock generator 52 is provided within single-chip digital controller 2, for generating clock signal CLK and other internal clocks within digital controller 2. Especially considering the PWM output to be generated, PWM timer 56 is provided within digital controller 2, as are optional timers 58 as desired. For carrying out the digital power supply control function described above, single-chip digital controller 2 includes ADC 4, which receives an input voltage (or current) at terminal OUT_IN, and generates a digital signal corresponding to this input voltage (or current) that is sampled by the SAMPLE instruction described above, and that is used to address coefficient product memory 22 to produce the output control signal. Single-chip digital controller 2 also includes PWM control circuit 6, which receives the digital output signal on lines DUTY and which generates the pulse-width modulated control signals used to drive the power supply, as described above relative to FIG. 1.

This first preferred embodiment of the invention is thus capable of efficiently performing digital control operations, for example in effecting feedback control of a drive signal such as in a power supply or motor controller, or in a more general sense, in applying a digital filter to a sampled signal. The computational circuitry is extremely streamlined in this first preferred embodiment of the invention, especially by storing pre-calculated coefficient products for the available values of the input signal, so that a sum-of-products operation as used in digital filter equations can be rapidly executed, preferably within a single clock cycle. As such, the computational circuitry can be a very low cost function, and readily implemented into a single-chip solution. In addition, the operation of the digital controller according to this first preferred embodiment of the invention is under program control, and implemented in a way that permits reprogramming of the digital controller; this reprogramming can include storing new coefficient product values, which also permits the changing of the control equation coefficients, as well as the modification of the control program itself. This provides great flexibility in the use of this controller, which is not available in conventional analog control circuits.

Figure 8:
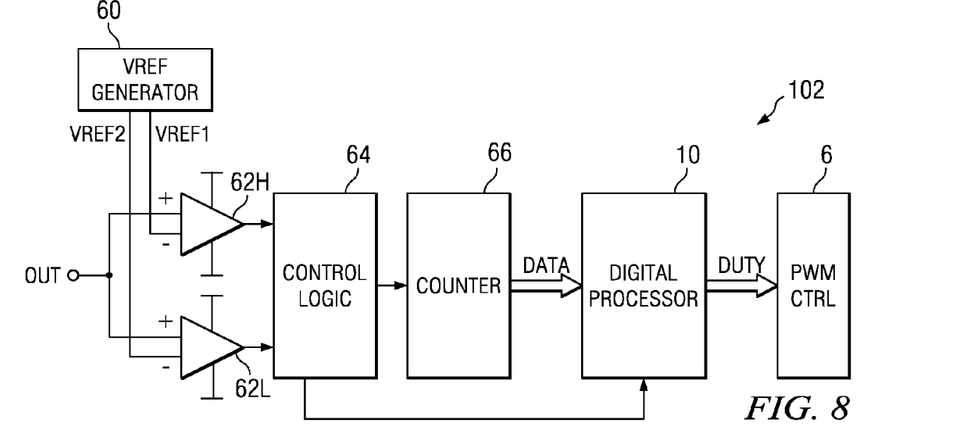
FIG. 8 is an electrical diagram, in block form, of a digital controller according to a second preferred embodiment of the invention.

It is contemplated that, for certain applications such as power supply control, additional efficiencies in the implementation of the digital controller according to this invention can be achieved, primarily by eliminating the need for an analog-to-digital converter (ADC 4 of FIGS. 1 and 7). The applications that may best benefit from this further efficiency are those in which the signal being controlled rises and falls over time, and does not "jump" from value to value over wide intervals. Referring now to FIG. 8, digital controller 102 according to a second preferred embodiment of the invention, in which the analog-to-digital converter is eliminated, will now be described in detail.

In digital controller 102 according to this second preferred embodiment of the invention, digital processor 10 is constructed as before, and as such receives an input digital signal DATA and, responsive to the value of this signal and to the values of the coefficient products stored in coefficient product memory 22 as described above, generates an output signal DUTY that is applied to PWM control circuit 6, which in turn controls the level of output voltage OUT (FIG. 1). As mentioned above, there is no analog-to-digital converter circuit (e.g., ADC 4) in this second preferred embodiment of the invention. Rather, circuitry is provided within digital controller 102 that replicates this function, based on a comparison of output voltage OUT against multiple reference voltages. This circuitry is used to modulate the replicated ADC function by adjusting the digital input value DATA, and by controlling recursive register 32 (FIG. 6) in digital processor 10 to either add or subtract the output of register ACCA from the prior value, thus increasing or decreasing the output duty cycle.

Voltage reference circuit 60, in this embodiment of the invention, generates two reference voltages VREF1, VREF2, with reference voltage VREF1 being higher than reference voltage VREF2. Reference voltage VREF1 is applied to the negative input of comparator 62H, and output voltage OUT (or a feedback signal derived from output voltage OUT) is applied to the positive input of comparator 62H. Similarly, reference voltage VREF2 is applied to the negative input of comparator 62L, and output voltage OUT (or a feedback signal derived from output voltage OUT) is applied to the positive input of comparator 62L. In this way, comparator 62H issues a positive voltage responsive to output voltage OUT being higher than reference voltage VREF1 (and issues a negative voltage otherwise), and comparator 62L issues a positive voltage responsive to output voltage OUT being higher than reference voltage VREF2 (and issues a negative voltage otherwise). Each of comparators 62H, 62L are biased by positive and negative voltages outside of the expected output voltage range, for example by +10 volts and −10 volts. The outputs of comparators 62H, 62L are applied to control logic 64.

Control logic 64 generates logic signals in response to a logical combination of the signals at the outputs of comparators 62H, 62L, and applies the result of this logical combination to a control input of counter 66. Counter 66 is a binary counter that, in this example, counts down with each clock cycle, under the control of control logic 64. In this embodiment of the invention, counter 66 forwards its contents to digital processor 10 on lines DATA.

In operation, control logic 64 derives its control signals in response to the relationship between output voltage OUT and reference voltages VREF1, VREF2. There are three possible results of the comparisons performed by comparators 62H, 62L:

| OUT > VREF1 (Comparator 62H) | OUT > VREF2 (Comparator 62L) | Condition |
|---|---|---|
| 0 | 0 | Heavy Load |
| 0 | 1 | Minimum Load |
| 1 | 1 | No Load |

The case in which output voltage is higher than reference voltage VREF2 and less than reference voltage VREF1 corresponds to a so-called "minimum load" situation, in which output voltage OUT is expected to decay slowly as its load draws current in operation. In response to this condition, and upon execution of a SAMPLE instruction, control logic 64 controls counter 66 so that its contents are not changed. Control logic 64 also issues a control signal to recursive register 32 so that adder/subtractor 50 adds the contents of register ACCA to the prior output value, following the calculation of the sum of the coefficient products. In other words, the output value $y_n$ is derived from the equation:

$$y_n = y_{n-1} + (a \pm b' + c'')$$

where the decision to add or subtract the first previous coefficient product b' depends on the particular filter equation, as described above. The digital input DATA is defined by the current contents of counter 66, which are preferably initialized (or have settled) to a somewhat steady-state value. In this mode, it is contemplated that the PWM duty cycle will gently increase, to account for the decay of output voltage OUT.

In the no-load case, where output voltage OUT exceeds reference voltage VREF1 (and necessarily exceeds reference voltage VREF2), control logic 64 also controls counter 66 so that its contents do not change upon execution of a SAMPLE instruction. Control logic 64 also issues a control signal to recursive register 32 so that adder/subtractor 50 subtracts the contents of register ACCA from the prior output value. The output value $y_n$ in this case is derived from the equation:

$$y_n = y_{n-1} - (a \pm b' + c'')$$

where the decision to add or subtract the first previous coefficient product b' again depends on the particular filter equation being used. Similarly as above, the digital input DATA is defined by the current contents of counter 66, which are preferably initialized (or have settled) at a somewhat steady-state value. In this mode, it is contemplated that the PWM duty cycle will gently decrease, to compensate for the rise in output voltage OUT in this no-load condition.

Under heavy load, output voltage OUT falls below reference voltage VREF2 (and necessarily falls below reference voltage VREF1). In response to the output of comparators 62H, 62L indicating this condition, and upon execution of a SAMPLE instruction, control logic 64 toggles counter 66 to decrement its contents. In addition, as in the minimum load case, control logic 64 controls recursive register 32 to add the contents of register ACCA to the prior output value, following the calculation of the sum of the coefficient products. The output value $y_n$ thus corresponds to:

$$y_n = y_{n-1} + (a \pm b' + c'')$$

where the decision to add or subtract the first previous coefficient product b' depends on the particular filter equation, as described above. Because counter 66 is decremented, however, and considering the inverse variation of the coefficient product word relative to the value of input signal DATA (FIG. 4), the output signal on lines DUTY, and thus the PWM duty cycle, will increase more rapidly in this no-load case than in the minimum load case. Eventually, output voltage OUT will again exceed the lower reference voltage VREF2, so that subsequent SAMPLE instructions will maintain the contents of counter 66 at that steady-state value.

According to this second preferred embodiment of the invention, therefore, the circuitry required in the realization of a digital controller for an analog output is further simplified, by avoiding the need for an analog-to-digital converter. The technology required for implementation of this digital controller may therefore be much simplified, not only in the number of devices but also by permitting virtually a completely digital solution. In addition, this second preferred embodiment of the invention also includes the ability, as does the first preferred embodiment of the invention described above, of being programmed and reprogrammed, providing a great deal of flexibility in the implementation of the digital filter and control functions, particularly by providing the ability to modify the coefficient products stored in memory.

As mentioned above, this invention is particularly beneficial in feedback control applications such as power supply control and motor control. However, it is contemplated that many other circuit and system applications in which a digital filter is implemented may also benefit from the use of this invention. It is therefore contemplated that these alternatives are also within the scope of this invention as claimed.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A digital processor for a power supply, comprising:
an addressable coefficient product memory for storing coefficient product values corresponding to a plurality of coefficients multiplied by each of a plurality of available input values, wherein each of a plurality of addresses is associated with a plurality of coefficient product values;
an address circuit for applying an address to the coefficient product memory corresponding to a received input value;
a first adder circuitry, for additively combining a selected plurality of coefficient product values, responsive to a program instruction, to produce an output value, wherein the output value determines the level of an output voltage of the power supply; and
wherein the first adder circuitry comprises circuitry for at least one of adding or subtracting a selected plurality of coefficient product values responsive to a program instruction, the adding and subtracting comprises a first adder, coupled to receive first and third coefficient product values, the third coefficient product value corresponding to a twice-delayed coefficient product value, at least one of an adder or a subtractor coupled to receive an output of the first adder and a second coefficient product value, the second coefficient product value corresponding to a once-delayed coefficient product value, for selectively adding or subtracting the second coefficient product value to or from the output of the first adder responsive to a program instruction.

2. The digital processor of claim 1, wherein the plurality of coefficient product values associated with each address value corresponds to each of the plurality of coefficients multiplied by the input value corresponding to the address value.

3. The digital processor of claim 2, further comprising:
a first register for storing the plurality of coefficient product values from the coefficient product memory associated with an address value, and having an output for forwarding a first coefficient product value to the first adder circuitry; and
a second register, coupled to the first register, for storing a second coefficient product value received from the first register, and having an output for forwarding the stored second coefficient product value to the first adder circuitry.

4. The digital processor of claim 3, wherein the second register is also for storing a third coefficient product value received from the first register;
and further comprising:

a third register, for storing the third coefficient product value received from the second register, and having an output for forwarding the stored third coefficient product value to the first adder circuitry.

5. The digital processor of claim 1, wherein the address circuitry comprises:
a plurality of registers, for storing a sequence of received input values;
wherein the address circuitry applies an address value to the coefficient product memory corresponding to the contents of the plurality of registers.

6. The digital processor of claim 1, further comprising:
second adder circuitry, having a first input coupled to receive the output of the first adder circuitry, having an output, and having a second input coupled to the output of the second adder circuitry.

7. The digital processor of claim 6, wherein the second adder circuitry comprises adding and subtracting circuitry, for selectably adding or subtracting the output of the first adder circuitry to or from the output of the second adder circuitry.

8. A feedback-controlled system of a power supply, comprising:
input circuitry, for receiving a feedback signal and generating an input value therefrom;
a digital processor, comprising:
an addressable coefficient product memory for storing coefficient product values corresponding to a plurality of coefficients multiplied by each of a plurality of available input values, wherein each of a plurality of addresses is associated with a plurality of coefficient product values;
an address circuit for applying an address to the coefficient product memory corresponding to a received input value from the input circuitry; and
a first adder circuitry, for adding a selected combination of coefficient product values to produce a control value; and
output circuitry, coupled to the digital processor, for generating an output signal responsive to the control value, wherein the output signal determines the level of an output voltage of the power supply; and
wherein the first adder circuitry comprises circuitry for at least one of adding or subtracting a selected plurality of coefficient product values responsive to a program instruction, the adding and subtracting comprises a first adder, coupled to receive first and third coefficient product values, the third coefficient product value corresponding to a twice-delayed coefficient product value, at least one of an adder or a subtractor coupled to receive an output of the first adder and a second coefficient product value, the second coefficient product value corresponding to a once-delayed coefficient product value, for selectively adding or subtracting the second coefficient product value to or from the output of the first adder responsive to a program instruction.

9. The system of claim 8, wherein the input circuitry comprises an analog-to-digital converter.

10. The system of claim 8, wherein the output circuitry comprises:
pulse width modulation control circuitry, for generating a pulse width modulated signal having a duty cycle corresponding to the control value; and
output drive circuitry, coupled to the pulse width modulation control circuitry, for driving an output responsive to the pulse width modulated signal.

11. The system of claim 8, wherein the plurality of coefficient product values associated with each address value corresponds to each of the plurality of coefficients multiplied by the input value corresponding to the address value.

12. The system of claim 11, further comprising:
a first register for storing the plurality of coefficient product values from the coefficient product memory associated with an address value, and having an output for forwarding a first coefficient product value to the first adder circuitry; and
a second register, coupled to the first register, for storing a second coefficient product value received from the first register, and having an output for forwarding the stored second coefficient product value to the first adder circuitry.

13. The system of claim 12, wherein the second register is also for storing a third coefficient product value received from the first register;
and further comprising:
a third register, for storing the third coefficient product value received from the second register, and having an output for forwarding the stored third coefficient product value to the first adder circuitry.

14. The system of claim 8, wherein the address circuitry comprises:
a plurality of registers, for storing a sequence of received input values;
wherein the address circuitry applies an address value to the coefficient product memory corresponding to the contents of the plurality of registers.

15. The system of claim 8, further comprising:
second adder circuitry, having a first input coupled to receive the output of the first adder circuitry, having an output, and having a second input coupled to the output of the second adder circuitry.

16. The system of claim 15, wherein the second adder circuitry comprises adding and subtracting circuitry, for selectably adding or subtracting the output of the first adder circuitry to or from the output of the second adder circuitry.

17. The system of claim 1, wherein the input circuitry comprises:
a plurality of comparators, for comparing the feedback signal against a corresponding reference level;
a counter, for digitally counting responsive to the plurality of comparators and for generating the input value corresponding to its count; and
control logic, coupled to the plurality of comparators and to the second adder circuitry, for controlling the counter responsive to the comparators, and for controlling the second adder circuitry to add or subtract the second coefficient product value to or from the output of the first adder responsive to the comparators.

18. The system of claim 8, wherein the input circuitry comprises:
a plurality of comparators, for comparing the feedback signal against a corresponding reference level; and
a counter, for digitally counting responsive to the plurality of comparators and for generating the input value corresponding to its count.

19. The system of claim 18, wherein the input circuitry comprises:
control logic, coupled to the plurality of comparators, for controlling the counter responsive to the comparators.

20. A method of executing a digital filter operation relating to a power supply, comprising the steps of:
storing, in a coefficient product memory, a coefficient product corresponding to each of a plurality of coefficients multiplied by each of a plurality of available input values;

receiving an input value;

applying an address value corresponding to the received input value to the coefficient product memory;

reading, from the coefficient product memory, a plurality of coefficient products associated with the address value, the plurality of coefficient products including a coefficient product involving each of the plurality of coefficients;

additively combining the plurality of coefficient products from the reading step to produce an output value, wherein the output value determines the level of an output voltage of the power supply; and wherein the additively combining step comprises adding a first one of the plurality of coefficient products with a delayed third one of the plurality of coefficient products from a second previous iteration to produce a sum, and subtracting a delayed second one of the plurality of coefficient products from a the previous iteration from the sum.

21. The method of claim 20, wherein the plurality of coefficient products from the reading step comprises the product of each of the coefficients multiplied by the received input value.

22. The method of claim 20, further comprising:

repeating the receiving, applying, reading, delaying, and additively combining steps for a plurality of iterations; and wherein the additively combining step combines the delayed second one of the plurality of coefficient products from a previous iteration with a first one of the plurality of coefficient products from the reading step in a current iteration.

23. The method of claim 20, wherein the additively combining step combines the delayed third one of the plurality of coefficient products from a second previous iteration with the delayed second one of the plurality of coefficient products from the previous iteration with a first one of the plurality of coefficient products from the reading step in the current iteration.

24. The method of claim 20, wherein the applying step comprises:

storing a sequence of received input values; and generating an address value corresponding to the sequence of received input values.

25. The method of claim 20, wherein the receiving step comprises:

receiving an analog signal; and converting the received analog signal into a corresponding input value in digital form.

26. The method of claim 20, wherein the receiving step comprises:

receiving a feedback signal;

comparing the feedback signal to a plurality of reference levels; and controlling a counter to produce the input value in digital form responsive to the comparing step.

27. The method of claim 20, wherein the additively combining step further comprises:

additively combining the plurality of coefficient products from the reading step, and a previous output value, to produce the output value.

\* \* \* \* \*